Nov. 16, 1965
I. JEPSON ETAL
3,217,408
HEDGE TRIMMER
Filed April 3, 1963
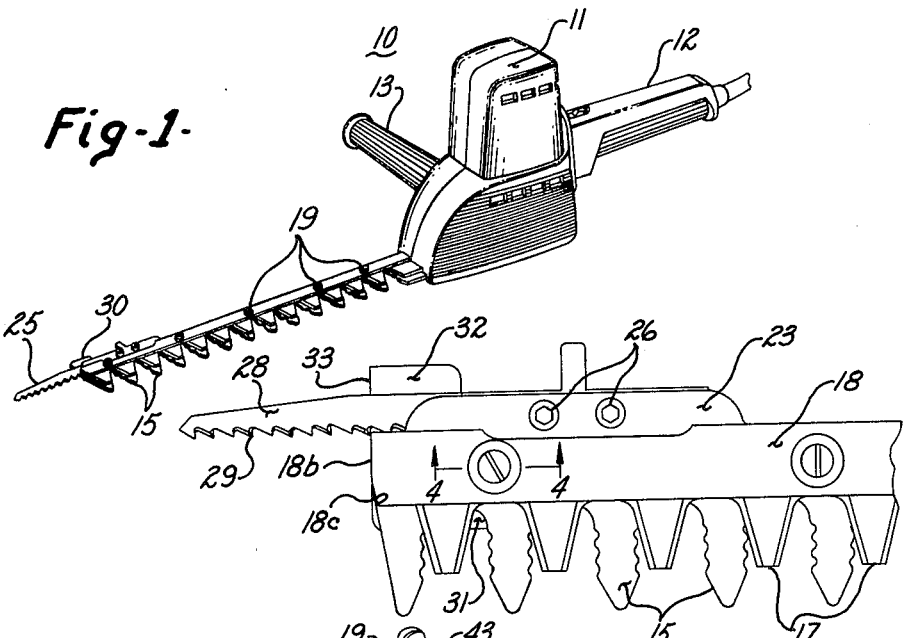
Fig-1.
Fig-2.
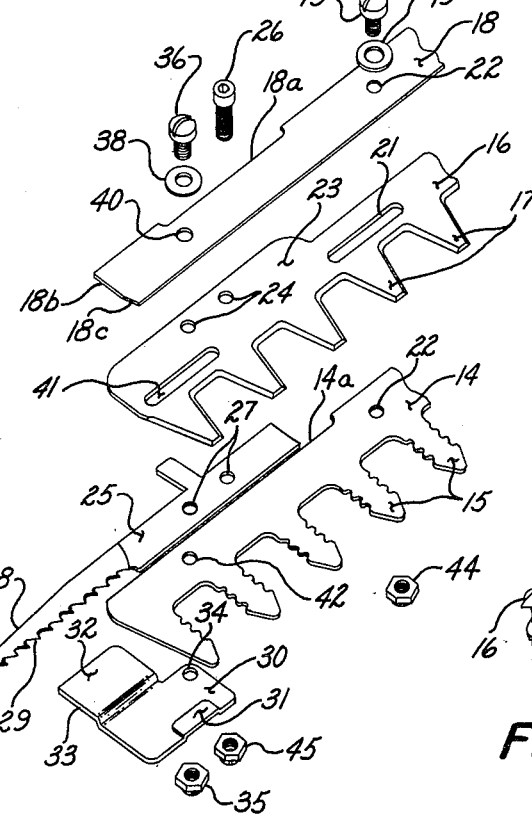
Fig-3.
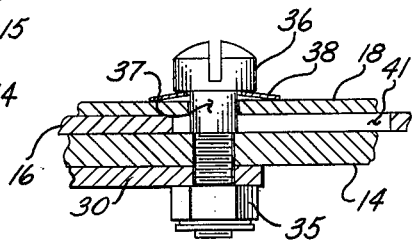
Fig-4.
INVENTORS.
IVAR JEPSON
HARRY M. NEBEN
BY
George R. Clark
Attorney:

3,217,408
HEDGE TRIMMER
Ivar Jepson, Oak Park, and Harry M. Neben, Western Springs, Ill., assignors to Sunbeam Corporation, Chicago, Ill., a corporation of Illinois
Filed Apr. 3, 1963, Ser. No. 270,305
10 Claims. (Cl. 30—166)

The present invention relates to garden cutting tools and more particularly to portable electric hedge trimmers.

Electric hedge trimmers for shearing shrubbery are well known and provide a device for nonskilled gardeners to trim a hedge in relatively expeditious manner. While electrically powered hedge trimmers have been commercially successful for a number of years, the prior art trimmers have failed to provide a unit capable of completing the hedge trimming operation. The proper grooming or maintaining of a hedge required the cutting away of old growth and dead portions to stimulate new growth and development of the hedge. In this connection, many large branches are encountered which are beyond the shearing capacity of the portable trimmer. In other instances, dead limbs have to be severed at the ground level in order that the hedge may continue to renew itself. Most of the hedge trimmers on the market can easily shear new growth on shrubbery but obviously cannot accept mature limbs up to one inch in diameter. Thus most quality power driven hedge trimmers provide a slip clutch arrangement in order to protect the unit from damage when a limb or other object is contacted which exceeds the shearing capacity of the tool. When a thick limb is to be severed, another cutting instrument must be employed which necessitates both additional cost in equipment and trimming time. It would be desirable to provide a hedge trimmer with which shrubbery can easily be sheared and, at the same time, provide a means for severing large limbs beyond the capacity of the shearing cutter in order to present a single cutting instrument to complete the hedge trimming and grooming operation. That is to say, it is desirable to have a single cutting instrument to accomplish the primary objective of trimming the shrubbery.

Accordingly it is the object of the present invention to provide an improved hedge trimmer having improved capacity to cut shrubbery.

It is another object of the present invention to provide an improved hedge trimmer performing both a shearing and sawing operation.

Still another object of the present invention is to provide an improved hedge trimmer having both a shearing and sawing means wherein the sawing element may be replaced.

An additional object of the invention is to provide a hedge trimmer having both a shearing and sawing means which is light weight.

A further object of the invention is to fulfill the above stated objects in a hedge trimmer which is low cost.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of a hedge trimmer embodying the present invention shown with a portion of the electric power cord removed;

FIG. 2 is an enlarged top plan view of a portion of FIG. 1;

FIG. 3 is an exploded assembly view of the portion of the hedge trimmer illustrated in FIG. 2; and FIG. 4 is a sectional view taken along the line 4—4 of FIG. 2.

Briefly, in the preferred form of the invention, the disadvantages of the prior art are overcome by positioning a saw element near the outer end of the reciprocating hedge trimmer shearing cutter and providing a limb rest portion associated with the stationary comb to act as a support during the sawing stroke. Thus the hedge trimmer may be used to shear relatively small branches with the reciprocating shearing cutter and to saw large branches with the saw element.

As illustrated in FIG. 1, the hedge trimmer 10 comprises a split housing 11 containing the internal parts such as electric motor, gear reduction means, reciprocating transfer mechanism and the like which are not illustrated and do not form a part of the present invention. The operation of the internal parts are completely disclosed in patent application Serial No. 107,376, filed May 3, 1961, and assigned to the same assignee as the present application. Extending from the housing 11 is a handle 12 containing the electrical switch and encasing the electric power cord which emerges from the handle at the end remote from the housing. An auxiliary side handle 13 extends from the housing 11 and lies perpendicular to the handle 12 to provide additional support for the hedge trimmer in order to reduce operator fatigue.

Rigidly attached to the housing 11 is an elongated stationary cutter 14, sometimes referred to as a comb, having along at least one edge a plurality of equally spaced shearing teeth 14 which are relatively widely spaced to permit the entrance of twigs, branches, limbs and other objects to be sheared. A movable elongated reciprocating cutter 16 having somewhat the same configuration as the comb 14 is in sliding engagement with comb 14 and has integrally spaced shearing teeth 17 positioned to cooperate with the comb teeth 15 for shearing material therebetween. The cutter 16 is mounted for lengthwise sliding movement in engagement with the upper surface of comb 14 with the cutter teeth 17 and the comb teeth 15 in shearing engagement. The drive mechanism within the housing 11 reciprocates the cutter 16 and is disclosed in the patent application Serial No. 107,376, filed May 3, 1961.

To urge the reciprocating cutter 16 into engagement with the comb 14, there is provided a stationary pressure strip 18 which overlies the cutter 16. Bolts 19 extend through clearance openings 20 and 22 in the strip 18 and the comb 14, respectively, and, by means of lock nuts 44 clamp the cutter 16 in sandwiched relation between the strip 18 and comb 14. To secure uniform tension between comb 14 and cutter 16, a circular concave spring washer 43 is positioned between the head of bolt 19 and strip 18.

To allow for the reciprocation of the cutter 16, there are formed slots 21 through which the bolts 19 extend. The lock nuts may be adjusted to obtain the desired pressure between cutter 16 and comb 14.

The heretofore mentioned comb and cutter arrangement for a hedge trimmer is well known and has been used extensively in commerce. Hedge trimmers of this type, however, have been lacking in their ability to accomplish a complete trimming and grooming operation due to the limited shearing capacity inherent in a relatively small portable design. In accordance with the present invention, a saw element 25 is connected to the underside of an integrally formed, flat, elongated projection 23 on cutter 16 near the end remote from housing 11 and positioned on the opposite side from the row of cutter teeth 17. A plurality of spaced clearance openings 27 are provided in saw 25 to align with similarly spaced clearance openings 24 in the projection 23. For rigidly affixing the saw 25 to the projection 23, a plurality of bolts 26 extend through openings 24 and 27 and are locked in place by nuts 45.

As illustrated in FIG. 3, the saw element 25 has a forward cutting portion 28 which extends beyond the furthermost end of the cutter 16 for engaging heavy limbs, branches or the like. Along one edge of portion 28 are integrally formed saw teeth 29 which are generally pitched towards the stationary comb 14 so that the cutting stroke for the saw occurs when the cutter 16 is reciprocated toward the housing 11. It will be appreciated, therefore, that the pitch of the saw teeth 29 will force the object to be sawed toward the stationary comb 14 for a reason explained in detail hereinafter. Preferably the saw element 25 is connected to the cutter 16 in such a manner that the row of saw teeth 29 lies substantially in alignment with the direction of reciprocation of the cutter 16 in order that the saw will cut evenly without vibrating the work. Naturally, the row of saw teeth 29 may be inclined slightly relative to the direction of reciprocation so that each successive saw tooth will have the proper bite into the limb or alternately the teeth may be successively peaked to accomplish the same result. While it is possible to use a wide range of saw teeth, it has been determined that six teeth per inch does an excellent job on shrubbery. It will be appreciated that by positioning the saw element 25 to extend beyond both the comb and cutter, the cutting portion 28 of the saw element may be made relatively thin. Thus, the saw teeth 29 need only cut a sufficiently wide path to allow the cutting portion 28 to pass therethrough since no other portion of the hedge trimmer need enter the kerf. It will be apparent that the saw element 25 can be easily replaced if damaged or worn without the loss of the cutter 16.

For the purpose of providing clearance for screws 26 while reciprocating, a recess 18a is provided along one edge of pressure strip 18. Correspondingly, recess 14a is provided along the edge of comb 14 to provide clearance for saw element 25 to reciprocate.

When the saw blade 25 is presented to a limb to be severed, there is a tendency for the limb to wedge on to the blade after a shallow kerf has been established. Once the limb is wedged to the saw, very little effective sawing can be accomplished inasmuch as the limb will merely vibrate due to the reciprocation of the saw. In order to saw effectively, a means must be provided to maintain the limb in a steady position relative to the comb 14. As hereinbefore disclosed the saw teeth 29 are pitched generally toward the stationary comb which will draw the limb to the comb. In accordance with the present invention, a limb supporting member 30, as best illustrated in FIG. 3, is provided at the end of the comb 14 remote from the housing 11 to cooperate with the saw element 25 in maintaining the limb in a steady position. In order to properly secure the supporting member 30 to the comb 14, there is provided on member 30 a raised locking portion 31 having a configuration to be received between successive comb teeth 15 to prevent rotation thereof. That is to say, the raised portion 31 has a configuration to tightly mate with bight portion of comb teeth 15. In addition, integrally formed, flat, raised supporting portion 32 is designed to lock with the straight portion of recess 14a to further resist rotation of member 30 and lies in a plane parallel and closely spaced to the forward portion of the saw 28. Preferably, only a single screw 36 having a shoulder portion 37 is employed to fasten the supporting member 30 rigidly to comb 14. As illustrated best in FIGS. 3 and 4, the screw 36 passes through a clearance opening 40 in the pressure strip 18, elongated slot 41 for permitting reciprocation of the cutter 16, clearance opening 42 in the comb 14 and finally opening 34 in supporting member 30. A locking nut 35 rigidly locks shoulder portion 37 to the comb 14 and in combination with a spring washer 38 maintains the comb 14, cutter 16 and strip 18 under proper tension. With supporting member 30 properly connected to comb 14, a limb rest edge 33 of raised portion 32 is positioned substantially perpendicular to both the row of saw teeth 29 and the direction of cutter 16 reciprocation. The edge 33 is sufficiently long to rest a branch prior to contacting the cutting teeth 29, during the sawing operation and after the limb has been completely severed. Preferably the end 18b of pressure strip 18 which is remote from the housing 11 is in approximate alignment with edge 33 so that support is afforded one either side of saw element 25 to eliminate any tendency of the limb to bend due to the sawing action and to provide balanced support. Thus, the limb is supported in part by both edges 33 and end 18b. Edge 18b is provided with a lead portion 18c to prevent an object to be sawed from catching thereon.

In operation, the hedge trimmer movable cutter 16 and saw element 25 are reciprocatingly driven by the mechanism contained within the motor housing 11. As branches, limbs, twigs and the like are presented to the stationary and movable cutter, they are easily sheared therebetween. When large limbs are encountered or whole branches must be removed which exceed the shearing capacity of the cutter and comb, the operator can easily and quickly contact the limb along edge 33 of support member 30 and 18b of the pressure strip 18 for both guiding and supporting purposes. Since the teeth of the saw element 25 are pitched generally toward the stationary comb, the saw element will only cut while the movable cutter is reciprocating toward the support 30. The support edge 33 acts as a steady rest for maintaining the limb in position during the cutting stroke of the saw element. Therefore, the hedge trimmer herein described is capable of completely trimming and grooming shrubbery by virtue of the combined shearing and sawing portions of the unit.

The present hedge trimmer represents a material advance in the art by providing a single tool to accomplish completely the trimming and grooming of a hedge and still maintain a device which is sufficiently light weight to be acceptable as a hand-held tool. The sawing means provides an inexpensive arrangement for greatly increasing the cutting capacity of the hedge trimmer without any significant increase in over-all weight. Obviously, maintaining weight at a minimum in such portable power driven tools which are held by the operator for considerable periods of time is of prime importance. In addition, the sawing means as herein disclosed is low in cost and requires a minimum of parts. When the saw element is damaged or worn, the blade may easily be replaced without discarding the relatively expensive movable cutter.

While there has been illustrated and described a particular embodiment of the present invention, it will be understood that changes and modifications may occur to those skilled in the art and it is, therefore, contemplated by the appended claims to cover all such changes and modifications as fall within the true spirit and scope of the present invention.

What is claimed as new and desired to be secured by Letters Patent of the United States is:

1. In a hedge cutting device comprising an elongated stationary comb and an elongated reciprocating cutter having a row of spaced cutting teeth along at least one edge thereof in sliding engagement for shearing, drive means reciprocating said cutter, the improvement comprising a saw attachment, said attachment including a saw blade extending outwardly from one end of said cutter and having a row of saw teeth aligned generally in the direction of reciprocation of said cutter, said saw teeth being substantially parallel to and facing in the same direction as said cutter teeth, and a fixed support edge positioned on said comb which is substantially perpendicular to said saw teeth whereby said edge provides a work rest during the sawing operation.

2. In a hedge cutting device comprising a power transmission housing, a stationary comb connected to said housing, a reciprocably driven movable cutter positioned over said comb in sliding engagement for shearing, a stationary strip overlying said cutter for controlling the tension between said comb and cutter, said strip defining an edge, the improvement comprising a saw attachment, said attachment including a saw blade having a row of saw teeth along one edge, said saw blade connected to said cutter so that said saw teeth are positioned below and perpendicular to said stationary strip edge, and a support member connected to said comb, said member defining an edge, said member positioned so that said member edge is in alignment with said strip edge and perpendicular to said saw teeth whereby objects for sawing are supported by both said supporting member edge and said strip edge which are positioned on either side of said saw blade.

3. In a hedge cutting device comprising a housing having an elongated stationary comb extending therefrom, an elongated movable cutter positioned above said stationary comb and reciprocatingly driven in the lengthwise direction, the improvement comprising a saw attachment, said attachment including a saw blade attached to the end of said movable cutter away from said housing, said saw blade having a row of cutting teeth pitched toward said comb and lying in the general direction of reciprocating movement of said cutter, and a limb supporting member secured to the end of said comb away from said housing and having one edge substantially perpendicular to the reciprocation direction of said saw blade, said member edge being positioned to cooperate with said saw blade whereby the saw cutting teeth force a branch for sawing against the supporting edge during the cutting stroke.

4. In a portable electric hedge trimmer comprising a power transmission housing, a stationary elongated comb rigidly attached to said housing and having relatively widely spaced cutting teeth along at least one of the elongated edges, a reciprocating cutter positioned above said comb having cutting teeth along at least one edge to cooperate with the cutting teeth on said comb to shear relatively small branches, the improvement comprising a saw attachment, said attachment including a saw element extending from the outer end of said movable cutter and having a row of saw teeth relatively closely spaced and pitched generally toward said comb, said saw teeth being aligned in the direction of reciprocation of said cutter, and a limb supporting member connected to said stationary comb by threaded fastening means and a raised portion of said member received between successive cutting teeth on said comb, said support member being provided with a stepped portion having an edge in close proximity with said saw teeth and disposed perpendicular thereto.

5. In a power driven garden cutting tool comprising a housing, a stationary comb supported by said housing, a movable cutter mounted for reciprocating motion adjacent said stationary comb for shearing relatively small branches, the improvement comprising a saw attachment, said attachment including a saw blade secured near one end of said reciprocating cutter, and a limb supporting member secured to said stationary comb to cooperate with said saw blade for sawing relatively large branches.

6. In a hedge cutting device including a stationary comb, a reciprocably driven cutter postioned above said comb in shearing relationship therewith, said comb having spaced teeth along one edge thereof, the improvement comprising a saw attachment, said attachment including a saw blade attached to said cutter, a support member adapted to cooperate with said saw blade and attached to said comb, locking means urging said member into rigid engagement with said comb, said member having a raised portion interlocking with said comb.

7. The attachment set forth in claim 6 wherein said support member is provided with a second raised portion which is adapted to interlock with said comb teeth in order to securely lock said member and comb together.

8. In a hedge cutting device comprising a housing, an elongated stationary comb connected to said housing, an elongated cutter having a row of relatively widely spaced cutting teeth along an edge in engagement with said comb for shearing small branches, mechanism means in said housing for reciprocating said cutter parallel to said row of teeth, the improvement comprising a saw blade provided with a row of relatively fine cutting teeth along one edge thereof for sawing large branches, said cutter having an integral projection at the end remote from said housing and extending from the side opposite said row of teeth, said projection defining at least two spaced openings, said saw blade defining at least two openings which are spaced to correspond with the projection openings, threaded fastening means for locking together said blade and projection by cooperating with said openings so that the row of blade teeth are substantially parallel to said row of cutting teeth whereby the reciprocation of said cutter reciprocates said blade in the same direction as said row of blade teeth.

9. In a hedge cutting device comprising a housing, an elongated stationary comb connected to said housing, an elongated cutter in engagement with said comb for shearing small branches, mechanism means in said housing for reciprocating said cutter, the improvement comprising a saw attachment, said attachment including an elongated saw blade, said cutter having an integral projection near the end remote from said housing, mounting means securing said blade to said projection whereby said mechanism means also reciprocates said blade for sawing larger branches.

10. In a hedge cutting device comprising a housing, an elongated stationary comb connected to said housing, an elongated reciprocating cutter having a row of spaced cutting teeth in sliding engagement with said comb for shearing, mechanism means in said housing for reciprocating said cutter, the improvement comprising a saw attachment, said attachment including a saw blade connected to said cutter and having a row of saw teeth aligned generally in the direction of reciprocation of said cutter, and a fixed support edge positioned on said comb which is adapted to cooperate with said saw blade to provide a work rest during the sawing operation.

References Cited by the Examiner

UNITED STATES PATENTS

| | | | |
|---|---|---|---|
| 1,224,194 | 5/1917 | Miller | 30—166 |
| 2,268,221 | 12/1941 | Michker | 30—216 |
| 2,563,264 | 8/1951 | Norgard | 30—166 |
| 2,619,721 | 12/1952 | King | 30—166 |
| 2,881,519 | 4/1959 | Gardner | 30—166 |
| 3,143,798 | 8/1964 | Lundquist | 30—166 |

WILLIAM FELDMAN, *Primary Examiner.*

MILTON S. MEHR, *Examiner.*